United States Patent
Algrain

(10) Patent No.: US 10,148,094 B2
(45) Date of Patent: Dec. 4, 2018

(54) HYBRID ELECTRICAL POWER GENERATION SYSTEM AND METHOD

(71) Applicant: Caterpillar Inc., Peoria, IL (US)

(72) Inventor: Marcelo C. Algrain, Dunlap, IL (US)

(73) Assignee: Caterpillar Inc., Deerfield, IL (US)

(*) Notice: Subject to any disclaimer, the term of this patent is extended or adjusted under 35 U.S.C. 154(b) by 177 days.

(21) Appl. No.: 15/298,738

(22) Filed: Oct. 20, 2016

(65) Prior Publication Data

US 2018/0115166 A1    Apr. 26, 2018

(51) Int. Cl.
*H02J 3/38*  (2006.01)
*H02J 9/06*  (2006.01)

(52) U.S. Cl.
CPC .............. *H02J 3/387* (2013.01); *H02J 3/381* (2013.01); *H02J 9/061* (2013.01); *H02J 2009/068* (2013.01)

(58) Field of Classification Search
CPC .... H02J 3/38; H02J 3/381; H02J 3/387; H02J 3/40; H02J 3/42; H02J 9/00; H02J 9/04; H02J 9/06; H02J 9/061; H02J 2009/068; Y10T 307/62; Y10T 307/718
See application file for complete search history.

(56) References Cited

U.S. PATENT DOCUMENTS

| | | | |
|---|---|---|---|
| 7,451,594 B2 | 11/2008 | Blaisdell | |
| 7,462,955 B2 * | 12/2008 | McNamara | H02J 3/005 307/64 |
| 7,800,248 B2 * | 9/2010 | Kramer | H02J 3/38 307/19 |
| 2004/0046458 A1 * | 3/2004 | MacKay | H02J 9/002 307/80 |
| 2010/0117452 A1 * | 5/2010 | Dunnmon | H02J 1/10 307/72 |
| 2015/0275750 A1 * | 10/2015 | Algrain | F02B 63/04 307/48 |
| 2015/0324696 A1 * | 11/2015 | Hirschbold | H02J 3/14 706/46 |

* cited by examiner

*Primary Examiner* — Levi Gannon

(57) ABSTRACT

A hybrid electrical power generation system is providing for powering a power consuming system including first and second loads. The hybrid system includes first and second primary generator sets, a redundant generator set, and a utility connection. Each generator set includes an engine mechanically coupled to an electrical power generator. The first primary generator set is fueled by a first fuel and is configured to supply electrical power to the first load, and the second primary generator set is configured to supply electrical power to the second load. The redundant generator set is fueled by a second fuel and is configured to supply electrical power to at least one of the first and second loads. The utility connection is configured to supply electrical power from a utility power grid to the first and the second loads. A controller controls distribution of electrical power to the first and second loads.

6 Claims, 3 Drawing Sheets

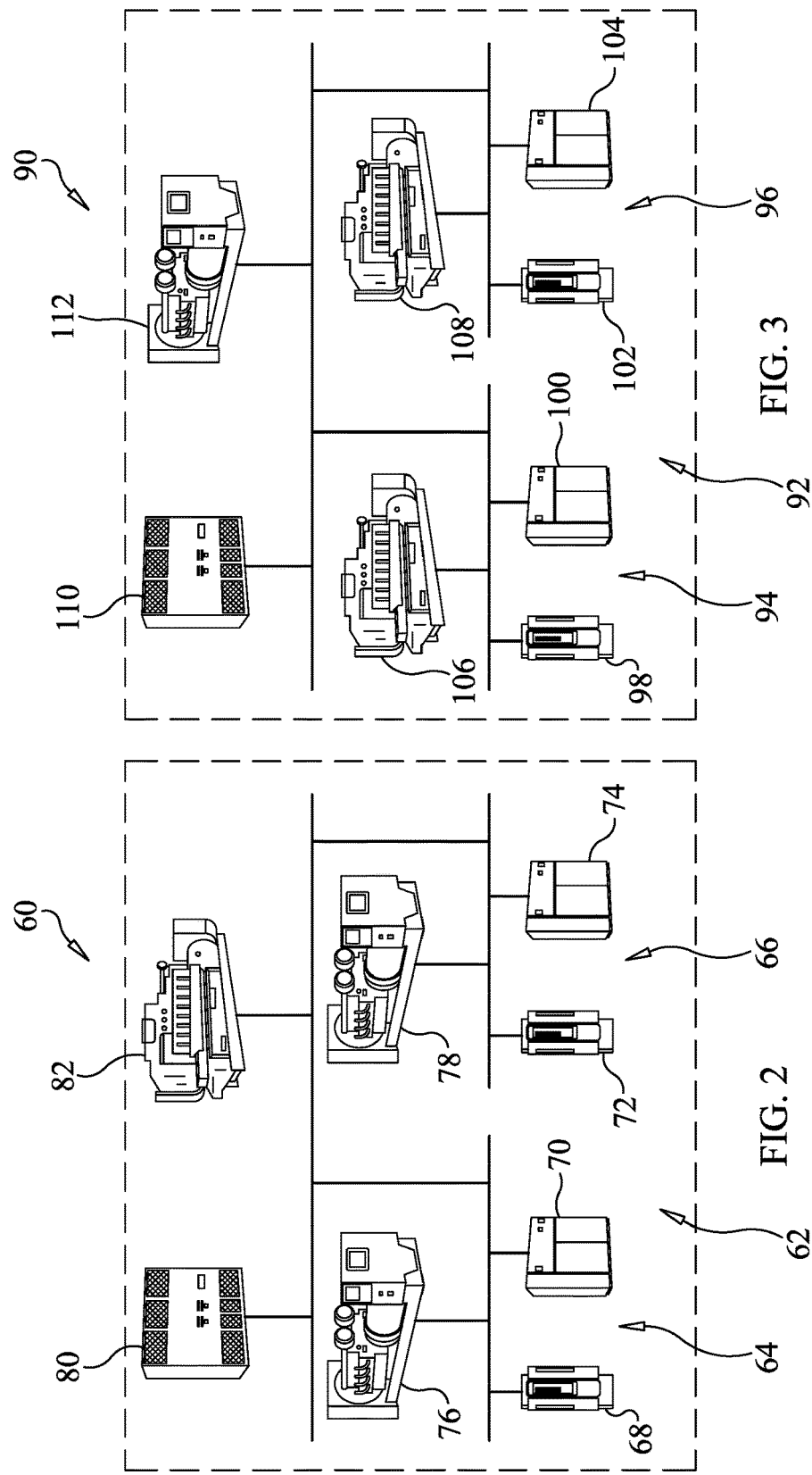

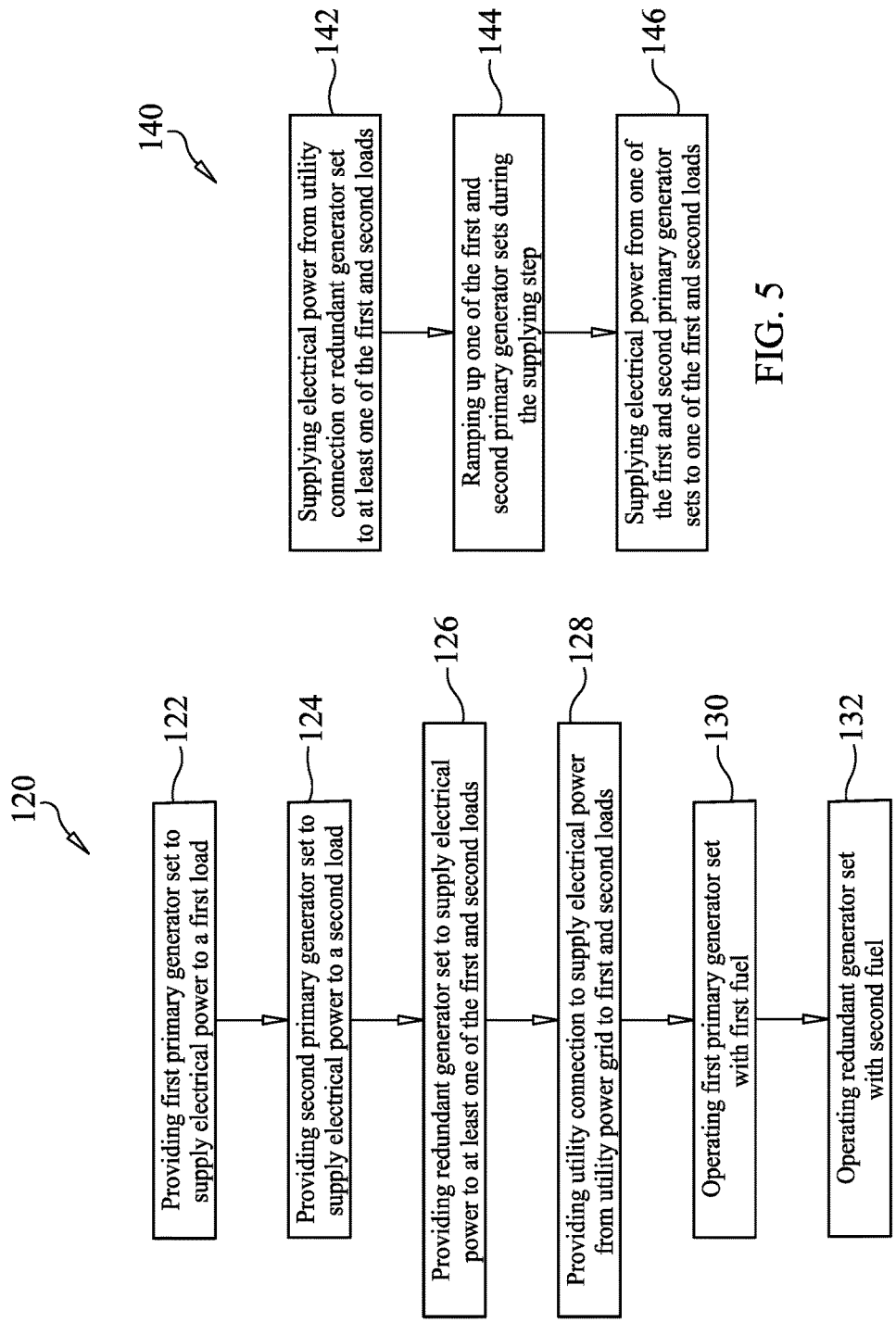

HYBRID ELECTRICAL POWER GENERATION SYSTEM AND METHOD

TECHNICAL FIELD

The present disclosure relates generally to a hybrid electrical power generation system including a modular electrical power generation system.

BACKGROUND

The electrical power needs of the data center industry, for example, continue to grow at a fast pace. In the past, data centers were strategically located near inexpensive, reliable power sources. Today, however, these locations are more difficult to come by, and pressure is mounting to find alternative solutions that will be less demanding on the utility power grid, particularly when electrical demand is high.

Despite many data centers having sufficient self-generation capacity from their diesel standby units, the viability of running these standby units to relieve the utility power grid is neither economically feasible, due to high costs of fuel, nor allowable by current air board restrictions that put limits on yearly hours of use. As a result, the function of diesel emergency units is purely for backup power at the data center during utility outages.

As should be appreciated, there is a continuing need to improve strategies of electrical power generation and distribution for facilities such as data centers, having demanding loads.

SUMMARY OF THE INVENTION

In one aspect, a hybrid electrical power generation system is provided for powering a power consuming system including a first load and a second load. The hybrid electrical power generation system includes a first primary generator set, a second primary generator set, a redundant generator set, and a utility connection. The first primary generator set includes a first engine fueled by a first fuel and mechanically coupled to a first electrical power generator to supply electrical power to the first load. The second primary generator set includes a second engine fueled by the first fuel and mechanically coupled to a second electrical power generator to supply electrical power to the second load. The redundant generator set includes a redundant engine fueled by a second fuel and mechanically coupled to a redundant electrical power generator to supply electrical power to at least one of the first load and the second load. The utility connection is configured to supply electrical power from a utility power grid to the first load and the second load. A controller of the hybrid electrical power generation system is programmed to control generation and distribution of electrical power to the first load and the second load.

In another aspect, a method for supplying electrical power to a power consuming system using a hybrid electrical power generation system is provided. The method includes steps of providing a first primary generator set configured to supply electrical power to a first load of the power consuming system, and providing a second primary generator set configured to supply electrical power to a second load of the power consuming system. The method also includes steps of providing a redundant generator set configured to supply electrical power to at least one of the first load and the second load, and providing a utility connection configured to supply electrical power from a utility power grid to the first load and the second load. The first primary generator set is operated with a first fuel and the redundant generator set is operated with a second fuel that is different than the first fuel. A controller is provided for controlling the generation and distribution of electrical power to the first load and the second load.

BRIEF DESCRIPTION OF THE DRAWINGS

FIG. 2 is a first optional implementation of the exemplary hybrid electrical power generation system of FIG. 1;

FIG. 3 is a second optional implementation of the exemplary hybrid electrical power generation system of FIG. 1;

FIG. 4 is a simplified flow diagram of a method of supplying electrical power using a hybrid electrical power generation system of the present disclosure; and FIG. 5 is a simplified flow diagram of optional steps of the method of FIG. 4.

DETAILED DESCRIPTION

Figure 1:
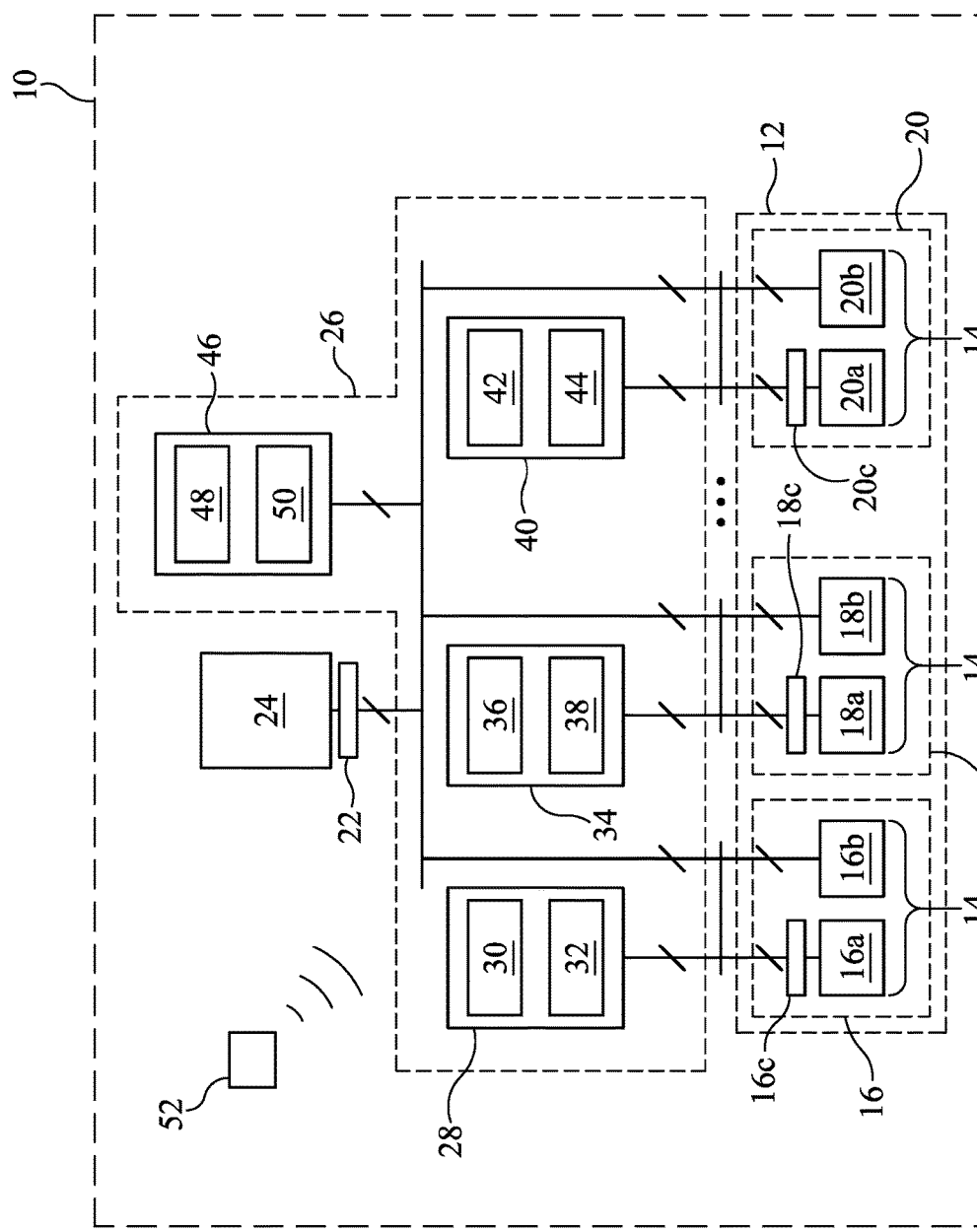
FIG. 1 is a simplified diagrammatic view of an exemplary hybrid electrical power generation system, according to the present disclosure.

Referring to FIG. 1, an exemplary hybrid electrical power generation system is shown generally at 10. The hybrid electrical power generation system 10 is configured for supplying, and also generating and/or distributing, electrical power to a power consuming load 12. According to the exemplary embodiment, the power consuming load 12 may include multiple power consuming systems and/or devices, all shown generally at 14 and all commonly found in a data center. Thus, according to the exemplary embodiment, the power consuming load 12 may include systems and components commonly found in a data center.

According to the example, the power consuming load 12 may include at least a first load 16, a second load 18, and a third load 20. Each of the first, second, and third loads 16, 18, and 20 may generally include a set of critical loads 16a, 18a, and 20a and a set of non-critical loads 16b, 18b, and 20b. That is, the first load 16 may include a first set of critical loads 16a and a first set of non-critical loads 16b. The second load 18 may include a second set of critical loads 18a and a second set of non-critical loads 18b. The third load 20 may include a third set of critical loads 20a and a third set of non-critical loads 20b. However, it should be appreciated that the number and type of loads of the power consuming load 12 may vary, depending on the particular application.

In the context of a data center, for example, critical loads 16a, 18a, and 20a may include IT hardware components that make up the IT business architecture, such as servers, routers, computer, storage devices, telecommunications equipment, etc., as well as the security systems, fire and monitoring systems that protect them. Examples of non-critical loads 16b, 18b, and 20b may include air conditioner and/or cooling system loads, and lighting loads, to name a few. The designation of critical load vs. non-critical load may vary, depending on the particular application.

Uninterruptible power supplies (UPSs) may be provided to supply power to at least some of the first, second, and third loads 16, 18, and 20, at least temporarily, when an electrical power supply fails, or will otherwise not be used, and before another power supply takes over. For example, a first UPS 16c is an electrical apparatus that provides emergency power to the first load 16 or, more importantly, the critical loads 16c of the first load 16, when a power source fails. Similarly, a second UPS 18c and a third UPS 20c are configured to provide emergency power to the critical loads 18a and 20a, respectively, when needed. A UPS is a known component that provides near-instantaneous protection from input power interruptions, by supplying energy stored in batteries. The UPS particularly protects hardware when an unexpected power disruption could cause injuries, fatalities, serious business disruption or data loss.

A utility connection 22 is also provided for supplying electrical power from a utility power grid 24 to the first load 16, second load 18, third load 20, and additional or alternative loads of the power consuming load 12. When electrical power is available from the utility power grid 24, a non-emergency condition may exist, whereas, when electrical power is not available from the utility power grid 24, an emergency condition may exist, particularly when the utility power grid 24 is intended to serve as the primary source of electrical power. An emergency condition may occur, for example, during a utility power outage. During these emergency conditions, a backup power system may be utilized to provide electrical power to at least some of the first, second, and third loads 16, 18, and 20.

In particular, and according to the exemplary embodiment, an additional or alternative supply of electrical power may be defined by a group of generator sets 26. As should be appreciated by those skilled in the art, the group of generator sets 26 may function as and may be referred to as a backup electrical power system. The group of generator sets 26 may include a first primary generator set 28 including a first engine 30 mechanically coupled to a first electrical power generator 32 and configured to supply electrical power to the first load 16, such as under certain conditions. A second primary generator set 34 may include a second engine 36 mechanically coupled to a second electrical power generator 38 and configured to supply electrical power to the second load 18 of the power consuming load 12. Similarly, a third primary generator set 40 may include a third engine 42 mechanically coupled to a third electrical power generator 44 and configured to supply electrical power to the third load 20.

Additional primary generator sets are also contemplated, depending on the specific implementation. Each of the first, second, and third generator sets 28, 34, and 40 may be similarly rated or may be rated based on a particular one of the first, second, and third loads 16, 18, and 20. The term "engine," as used herein, is intended to broadly cover various prime movers, including a variety of internal combustion engines running on various fuels, turbines, or other power sources.

The structure just described may be referred to as a modular architecture or configuration, in which the first primary generator set 28 supplies power to the first load 16, the second primary generator set 34 supplies power to the second load 18, and the third primary generator set 40 supplies power to the third load 20. That is, the first, second, and third primary generator sets 28, 34, and 40 may be configured to supply electrical power exclusively to one of the first, second, and third loads 16, 18, and 20. The group of generator sets 26 may also include a redundant generator set 46 including a redundant engine 48 mechanically coupled to a redundant electrical power generator 50 and configured to supply electrical power to at least one of the of first, second, and third loads 16, 18, and 20. That is, if one of the first, second or third primary generator sets 28, 34, and 40 fails, the redundant generator set 46 can replace, or take over for, the failed one of the first, second, and third primary generator sets 28, 34, and 40 in supplying power to a respective one of the first, second, and third loads 16, 18, 20.

The hybrid electrical power generation system 10 may be operated in a first operation mode, which may or may not be a primary operating mode, in which the utility connection 22 supplies electrical power from a utility power grid 24 to at least the first load 16, the second load 18, and the third load 20. If power through the utility connection 22 fails, the first, second, and third primary generator sets 28, 34, and 40 may supply power, respectively, to the first, second, and third loads 16, 18, and 20. That is the first, second, and third primary generator sets 28, 34, and 40 may replace power supplied to the first, second, and third loads 16, 18, and 20 from the utility power grid 24.

Each UPS 16c, 18c, and 20c may ensure there is no lapse in electrical power to at least the critical loads 16a, 18a, and 20a during the transition between utility power and generator set power. The redundant generator set 46, common to the modular architecture, may serve as a backup to one or more of the first, second, and third primary generator sets 28, 34, and 40 and may replace one or more of the primary generator sets 28, 34, and 40 in generating and supplying power to the first, second, and third loads 16, 18, and 20, if one of the primary generator sets 28, 34, and 40 fails.

The hybrid electrical power generation system 10 may also include all equipment necessary for controlling, switching, and transmitting the generated electrical power to the first, second, and third loads 16, 18, and 20, as described herein. That is, the hybrid electrical power generation system 10 may include transmission lines and connection equipment, such as transformers, electrical switches, power relays, circuit breakers, and the like. Further, the hybrid electrical power generation system 10 may include switches for switching between different power sources, or hardware and/or software for synchronizing the various power sources with the utility power grid 24. The hybrid electrical power generation system 10 may generate and/or supply electrical power in the form of alternating current or direct current, and may include a controller 52, including a microprocessor, for communicating with and controlling operations of the hybrid electrical power generation system 10 and controlling distribution of electrical power in a manner described herein.

Typically, these generator sets 28, 34, 40, and 46 are fueled with diesel fuel. Although these primary generator sets 28, 34 and 40 may be capable of powering the data center outside of an emergency condition, the viability of running these generator sets 28, 34, and 40 to simply relieve the utility power grid 24 in non-emergency conditions is neither economically feasible nor allowable given current air board restrictions. According to the present disclosure, and as will be described below, the primary generator sets 28, 34 and 40 may be fueled with a first fuel, and the redundant generator set 46 may be fueled with a second fuel that is different than the first fuel.

Turning now to FIG. 2, a particular implementation according to the present disclosure is shown. In particular, FIG. 2 depicts a hybrid electrical power generation system 60 including a power consuming system 62 having a first load 64 and a second load 66. The first load 64 may include critical loads 68 and non-critical loads 70, and the second load 66 may include critical loads 72 and non-critical loads 74. A first primary generator set 76 and a second primary generator set 78 may be fueled with diesel fuel and may include components similar to those described above. Also supplying power is a utility power grid 80 and a redundant generator set 82, which may be fueled by gas fuel and configured to supply electrical power to either or both of the first load 64 and the second load 66. According to this embodiment, the first and second primary generator sets 76 and 78 may be fueled exclusively with diesel fuel, and the redundant generator set 82 may be fueled exclusively with gas fuel.

The hybrid electrical power generation system 60 may be operated in a first operation mode, which may or may not be a primary operating mode, in which the utility power grid 80 supplies electrical power to at least the first load 64 and the second load 66. If power from the utility power grid is no longer available, the first and second primary generator sets 76 and 78 may supply power, respectively, to the first and second loads 64 and 66. That is, the first and second primary generator sets 76 and 78 may replace power supplied to the first and second loads 64 and 66 from the utility power grid 80. As described above, a UPS may be provided to ensure there is no lapse in power to at least the critical loads 68 and 72 during the transition between utility power and generator set power. The redundant generator set 82 may provide fail over for either of the first primary generator set 76 and the second primary generator set 78.

During a non-emergency condition, the redundant generator set 82, fueled by gas fuel, may be operated to provide electrical power to the first and second loads 64 and 66. That is, the redundant generator set 82 may replace or supplement utility power at particular times, such as, for example, during peak usage conditions. According to some embodiments, the redundant generator set 82 may be operated in a base load mode, with the utility power grid 80 and/or first and second primary generator sets 76 and 78 supplying electrical power to support the variable loads. A controller, such as controller 52 of FIG. 1, may control the operations of system components and the sourcing of electrical power to the first and second loads 64 and 66.

Turning now to FIG. 3, an alternative implementation according to the present disclosure is shown. In particular, FIG. 3 depicts a hybrid electrical power generation system 90 including a power consuming system 92 having a first load 94 and a second load 96. The first load 94 may include critical loads 98 and non-critical loads 100, and the second load 96 may include critical loads 102 and non-critical loads 104. A first primary generator set 106 and a second primary generator set 108 may be fueled with gas fuel and may include components similar to those described above. Also capable of supplying electrical power is a utility power grid 110 and a redundant generator set 112, which may be fueled by diesel fuel and may be configured to supply electrical power to either or both of the first load 94 and the second load 96. According to this embodiment, the first and second primary generator sets 106 and 108 may be fueled exclusively with gas fuel, and the redundant generator set 112 may be fueled exclusively with diesel fuel.

In addition to using the first primary generator set 106, second primary generator set 108, and the redundant generator set 112 as backup power, the hybrid electrical power generation system 90 may have operating modes in which one or both of the first and second primary generator sets 106 and 108 generate and provide electrical power to the first and second loads 94 and 96 in a non-emergency condition. For example, it may be desirable to utilize the first and second primary generator sets 106 and 108 in place of, or as a supplement to or in addition to, the utility power grid 110 at times when peak utility demand is high. A controller, similar to controller 52 of FIG. 1, may control system components and distribution of electrical power to the first and second loads 94 and 96.

Turning now to FIG. 4, and referring to the embodiments of FIGS. 2 and 3, a flow diagram 120 illustrating a high level method of supplying electrical power using one of the hybrid electrical power generation systems 60 and 90 is shown. At a first step, box 122, first primary generator sets 76 and 106 are provided to supply electrical power to first loads 64 and 94. At box 124, second primary generator sets 78 and 108 are provided to supply electrical power to second loads 66 and 96. Redundant generator sets 82 and 112 are provided to supply electrical power to at least one of the first and second loads 64, 66, 94, and 96, at box 126. The method also includes providing utility connections to supply electrical power from utility power grids 80 and 110 to the first and second loads 64, 66, 94, and 96, at box 128. At box 130, the first primary generator sets 76 and 106 are operated with a first fuel and, at box 132, the redundant generator sets 82 and 112 are operated with a second fuel that is different than the first fuel. In summary, the systems 60 and 90 are implemented and configured in a known fashion to generate and/or supply electrical power from the sources described to the loads described.

Turning now to FIG. 5, and referring also to FIG. 3, a controller, such as controller 52 of FIG. 1, controlling operations of the hybrid electrical power generation system 90, including controlling distribution of power to the first and second loads 94 and 96, may be programmed to execute a startup sequence, illustrated in flow diagram 140 of FIG. 5. The startup sequence includes supplying electrical power from the utility power grid 110 to one of the first and second loads 94 and 96 during a ramping up period of one of the first primary generator set 106 and the second primary generator set 108, both fueled with gas fuel, at box 142. Alternatively, at box 142, the controller may be programmed to execute a startup sequence that includes supplying electrical power from the redundant generator set 112, fueled by diesel fuel, during a ramping up period of one of the first primary generator set 106 and the second primary generator set 108.

After the first primary generator set 106 or the second primary generator set 108 is capable of supporting the loads 94 or 96, at box 144, electrical power will be supplied by at least one of the first and second primary generator sets 106 and 108 in place of, or as a supplement to or in addition to, the redundant generator set 112 or the utility power grid 110, at box 146. As such, the utility power grid 110 or the diesel generator set 112 may support or stiffen the electrical source while one or both of the gas generator sets 106 and 108 ramp up to a level to fully support one or both of the first and second loads 94 and 96. Additionally or alternatively, the utility power grid 110 or the diesel generator set 112 may support or stiffen the electrical source during operation of the gas generator sets 106 and 108.

INDUSTRIAL APPLICABILITY

The present disclosure relates generally to a hybrid electrical power generation system. More specifically, the present disclosure is applicable to a modular electrical power generation system. Such a modular electrical power generation system may include a plurality of primary generator sets, with each primary generator set supplying electrical power to a different load or set of loads, and a redundant generator set. The hybrid electrical power generation system includes generator sets utilizing different fuels, and provides for operations in emergency and non-emergency conditions.

Referring generally to FIG. 1, the teachings of the present disclosure include a method or strategy of supplying electrical power to a power consuming system 14 using a hybrid electrical power generation system 10. A power consuming system 14 of the present disclosure may include multiple loads, as described above. For example, the power consuming system 14 of FIG. 1 may include first, second, and third loads 16, 18, and 20, with each of the first, second, and third loads 16, 18, and 20 including critical loads 16a, 18a, and 20a, and non-critical loads 16b, 18b, and 20b. According to some embodiments, the critical loads 16a, 18a, and 20a may also be configured to receive power from a UPS 16c, 18c, and 20c.

The hybrid electrical power generation system 10 may have an operation mode in which a utility power grid 24 supplies electrical power through a utility connection 22 to the power consuming system 14. The hybrid electrical power generation system 10 also includes a group of generator sets 26 configured to supply electrical power to the first, second, and third loads 16, 18, and 20. The hybrid electrical power generation system 10 may also have an operation mode in which the group of generator sets 26 provides electrical power to the power consuming system 14, such as during an emergency condition in which utility power is not available.

According to a first exemplary implementation, shown in FIG. 2, first and second primary generator sets 76 and 78 may be fueled with diesel fuel, while the redundant generator set 82 may be fueled with gas fuel. During a non-emergency condition, the redundant generator set 82, fueled by gas fuel, may be operated to provide electrical power to the first and second loads 64 and 66. That is, the redundant generator set 82 may replace or supplement utility power at particular times, such as, for example, during peak usage conditions. Further, the redundant generator set 82 may be operated in a base load mode. The redundant generator set 82 may be initialized using a startup sequence, in which one of the primary generator sets 76 and 78 or the utility power grid 80 supply electrical power to one of the first and second loads 64 and 66 while the redundant generator set 82 ramps up and becomes capable of supporting one or more of the first and second loads 64 and 66.

According to a second exemplary implementation, shown in FIG. 3, first and second primary generator sets 106 and 108 may be fueled with gas fuel, while the redundant generator set 112 may be fueled with diesel fuel. The first and second primary generator sets 106 and 108 may generate and provide electrical power to the first and second loads 94 and 96 in a non-emergency condition. For example, it may be desirable to utilize the first and second primary generator sets 106 and 108 in place of, or in addition to, the utility power grid 110 at times when peak utility demand is high. The primary generator sets 106 and 108 may be initialized using a startup sequence, in which one of the redundant generator set 112 and/or the utility power grid 110 supply electrical power to one of the first and second loads 94 and 96 while one of the primary generator sets 106 and 108 ramps up. Additionally or alternatively, the utility power grid 110 or the diesel generator set 112 may support or stiffen the electrical source during operation of the gas generator sets 106 and 108.

Utilizing gas generator sets, such as redundant generator set 82 and primary generator sets 106 and 108, to power loads, such as data center loads, during non-emergency conditions may yield high cost savings, including low fuel costs, particularly when utilities offer financial incentives to reduce usage during peak usage times. Further, utilizing the startup sequence described herein remedies the possibility that the gas generator sets 106 and 108 may not be capable of fully matching the load acceptance transient response of diesel units.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A hybrid electrical power generation system for a power consuming system including a first load and a second load, wherein the first load and the second load are different, the hybrid electrical power generation system including:
   a first primary generator set including a first engine mechanically coupled to a first electrical power generator and configured to supply electrical power to the first load, wherein the first engine is fueled by gas fuel;
   a second primary generator set including a second engine mechanically coupled to a second electrical power generator and configured to supply electrical power to the second load of the power consuming system;
   a redundant generator set including a redundant engine mechanically coupled to a redundant electrical power generator and configured to supply electrical power to at least one of the first load and the second load, wherein the redundant generator set is fueled by diesel fuel
   a utility connection configured to supply electrical power from a utility power grid to the first load and the second load;
   a controller programmed to: control generation and distribution of electrical power to the first load and the second load; substitute, wholly or in part, electrical power from the utility connection with electrical power from the first primary generator set during a non-emergency condition; and execute a startup sequence that includes supplying electrical power from the utility connection or the redundant generator set to the first load during a ramping up period of the first primary generator set.

2. The hybrid electrical power generation system of claim 1, wherein the controller is programmed to substitute electrical power supplied from the utility connection to at least one of the first load and the second load with electrical power from the redundant generator set.

3. The hybrid electrical power generation system of claim 2, wherein the redundant generator set is operated in a base load mode.

4. A method for supplying electrical power to a power consuming system using a hybrid electrical power generation system, including:
   providing a first primary generator set configured to supply electrical power to a first load of the power consuming system;
   providing a second primary generator set configured to supply electrical power to a second load of the power consuming system;
   providing a redundant generator set configured to supply electrical power to at least one of the first load and the second load;
   providing a utility connection configured to supply electrical power from a utility power grid to the first load and the second load;
   operating the first primary generator set with gas fuel;
   operating the redundant generator set with diesel fuel;
   controlling the generation and distribution of electrical power to the first load and the second load with a controller;
   substituting, wholly or in part, electrical power from the utility connection with electrical power from the first primary generator set during a non-emergency condition using the controller; and executing a startup sequence that includes supplying electrical power from the utility connection or the redundant generator set to the first load during a ramping up period of the first primary generator set.

5. The method of claim 4, further including substituting, wholly or in part, electrical power supplied from the utility connection to at least one of the first load and the second load with electrical power from the redundant generator set.

6. The method of claim 5, further including operating the redundant generator set in a base load mode.

* * * * *